3,737,526
ANTIBIOTIC TREATMENT OF FISH DISEASES
Fred K. White, Glen Ellyn, Ill., assignor to Mulwhiteson
Development Company, Glen Ellyn, Ill.
No Drawing. Continuation-in-part of abandoned application Ser. No. 879,557, Nov. 24, 1969. This application May 4, 1971, Ser. No. 140,237
Int. Cl. A61k 27/00
U.S. Cl. 424—181                     2 Claims

ABSTRACT OF THE DISCLOSURE

This invention relates to the use of erythromycin in the treatment of susceptible externally manifested bacterial infections of fish and, more particularly, to the use of a water-soluble salt of erythromycin as an additive to the water environment of fish, either as a profilaxis to prevent or as a positive agent to cure such infections and to reduce shock and stress.

DESCRIPTION OF THE INVENTION

This application is a continuation in part of application S.N. 879,557, filed Nov. 24, 1969, now abandoned.

The present invention will be described primarily in connection with the treatment of external infections and principally bacterial infections prominent in pet fish, however, its utility applies equally to such infections in all types of fish.

Fish and particularly pet fish are subject to a wide variety of infections and, in addition, are also subject to shock and stress by reason of change in their natural environment such as temperature, water pH and corresponding changes which result from transportation over long distances under crowded conditions.

Most of the common infections of fish are readily recognizable and can be generally divided into three classes, namely (a) bacterial, (b) parasitic, and (c) fungicidal. Many so called "Fungal" diseases are actually deemed to be caused by bacteria rather than fungus. Further, it will be frequently found that fungal and parasitic diseases are followed by secondary bacterial infections.

Typical external diseases of fish considered to be bacterial are: columnaris, frequently called "body fungus," body rot or "Black Molly" disease; furunculosis, fin and tailrot; myxobacteria or gill disease; tuberculosis or neon disease; and popeye disease. Columnaris disease is characteristic of fresh water fish and can be recognized by a white appearing coating or spot on the body and frequently also around the mouth. This disease is very infectious and may easily spread to other fish in the same tank. Furunculosis disease is less common than columnaris disease and usually results from unclean tank conditions. There is no effective treatment for furunculosis at present. This disease is characterized by open sores or oozing lacerations appearing in any area. A common disease is fin and tailrot which is easily recognized by the deterioration and disappearance of fin sections. Tuberculosis or neon disease is recognized by the appearance of several yellow like spots immediately before the tail section. The disease generally results in a "wasting away" and short spurty swimming. Popeye is easily recognized by large bulging eyes and slow aimless swimming.

Various chemicals and drugs, including some antibiotics have been proposed for treatment of the foregoing bacterial diseases with only limited success. It has been found that certain water soluble salts of erythromycin are highly effective in the treatment of the described bacterial and similar external diseases of fish which are susceptible to its spectrum of activity.

Erythromycin is a well known antibiotic whose preparation and characteristics are described in the patent to Bunch et al. 2,653,899, dated Sept. 29, 1953. Its activity and utility are disclosed in the publication "Erythromycin," Abbott Laboratories, 1966. Various derivatives of this drug have been proposed for the treatment of diseases in humans and animals in the form of ointments, solutions, suppositories, tablets and as feed supplements.

Erythromycin is a non-toxic, odorless, white to grayish-white crystalline compound. Most of its derivatives, such as its acid salts, are non-soluble or only slightly soluble in water. The present invention is primarily concerned with the use of water-soluble salts of erythromycin in the treatment of external bacterial fish diseases, and particularly, salts exemplified by erythromycin phosphate and gluceptate.

The water soluble salts of erythromycin can be used for the treatment of external fish diseases in various forms such as prepared solutions, capsules or tablets. Presently preferred is a tablet composition containing a predetermined activity which can be readily packaged and dropped in a tank or other container where it will be dissolved in a relatively short period of time. When used for salt water fish treatment it may be desirable to initially dissolve the erythromycin salt in fresh water and then add the solution to the salt water environment to enhance rapid dissolution.

Minimum effective usage of the erythromycin salts of the present invention for profilaxis is generally about 5 mg. of activity per gallon of water. Such a dosage may be repeated every five days as a preventative measure, particularly where disease is known to be prevalent. However, as the drug is non-toxic, considerably higher concentrations can be readily used without harmful effect and are recommended to enhance the cure for a particular disease being treated. A presently preferred dosage for treatment of the aforementioned external diseases in fresh water fish is from 10–30 milligrams of activity per gallon of water. Such dosage may be added at approximately twenty four hour intervals until the condition is observed to have substantially disappeared. For salt water fish up to about twice the above dosage has been found to be preferred. Activity concentrations of ten times the foregoing dosages have been employed without apparent harmful effect.

Where erythromycin containing tablets are used to treat fish, they, preferably, should be capable of dissolving in the water environment within about one hour after introduction into a tank or vessel. Such tablets will preferably contain sufficient erythromycin as a soluble salt to provide between about 5–30 mg. of erythromycin activity per gallon of water. Normally the erythromycin salt will be combined with soluble binders such as salt, glucose, lactose and sodium benzoate and acetate.

The soluble erythromycin salts disclosed herein have been found to have appreciable effectiveness in treating the foregoing diseases by both private and public aquariums and by hobbyists. Losses of diseased fish due to external infections in many instances have been reduced by fifty percent or more as the result of several research programs undertaken using erythromycin.

Following are illustratice examples of the treatment of indicated diseases with erythromycin phosphate.

| Fish type | Disease | Activity dosage, mg./gal. | Cure time |
|---|---|---|---|
| Swordtail | Fin rot | 10 | 3 days. |
| Four Eyed Butterfly [1] | Fungus [2] (tail rot) | 20 | 18 hours. |
| Black French Angel [1] | Extensive fungus [2] (tail rot). | [3] 20 | 5 days. |

[1] Salt water fish.
[2] Considered to be derived from slime bacteria.
[3] 3 times at 24 hour intervals.

The effectiveness of the drug on the diseased fish was noted by periodic observation of the infected areas and a cure was deemed finalized by the appreciable reduction or elimination of the infection.

Disc sensitivity tests were conducted with erythromycin (concentration 15) using a ten percent sheep blood agar plate as the substrate and incubation at 37° C. for 24 hours. The following organisms deemed the cause of bacterial infections in fish were found sensitive to erythromycin:

(1) *Aeromonas punctata* ATCC 11163
(2) *Aeromonas salmonicida* ATCC 14174
(3) *Chrondrococcus columnaris* ATCC 23463

Erythromycin has also been found to be of considerable benefit in reducing shock and stress frequently encountered in fish when subject to long periods of transportation under crowded conditions, or when subject to the aforementioned environmental changes. Thus, fish shipped in plastic bag containers with water from, for example, Florida or Hawaii to the Midwest are noticeably exhausted and also appear to be at a loss for oxygen, causing them to swim errantly and appear to gulp for air. The addition of 5 mg. of activity of erythormycin as a soluble salt per gallon to the water containing such fish generally produce relative calmness in about one to two hours.

Having described the invention and certain of its embodiments, the same is only intended to be limited by the scope of the following claims.

I claim:
1. The method of treating externally manifested diseases of fish caused by a bacteria from the class consisting of *Aeromonas punctata, Aeromonas salmonicida* and *Chrondrococcus columnaris* which comprises dissolving in water containing fish having said diseases between 5 mg. to 30 mg. of activity of a water soluble salt of erythromycin for each gallon of water.
2. The method of claim 1 wherein said soluble salt of erythromycin is erythromycin phosphate.

References Cited
UNITED STATES PATENTS
3,276,956  10/1966  Cardinal _____ 260—210 E

OTHER REFERENCES

The Merck Veterinary Manual, 3rd edition, 1967, Merck and Co., Inc., pp. 1252–1254.

STANLEY J. FRIEDMAN, Primary Examiner